Dec. 21, 1943.    J. ABPLANALP    2,337,019
REPEAT WELDER
Filed Feb. 24, 1936    2 Sheets-Sheet 1

INVENTOR.
BY John Abplanalp
Barnes, Kisselle, Laughlin & Raisch
ATTORNEY.

Dec. 21, 1943.  J. ABPLANALP  2,337,019
REPEAT WELDER
Filed Feb. 24, 1936  2 Sheets-Sheet 2

INVENTOR.
BY John Abplanalp
Barnes, Kisselle, Laughlin & Raisch
ATTORNEY.

Patented Dec. 21, 1943

2,337,019

UNITED STATES PATENT OFFICE 2,337,019

REPEAT WELDER

John Abplanalp, Detroit, Mich., assignor to General Motors Corporation, Detroit, Mich., a corporation of Delaware Application February 24, 1936, Serial No. 65,332

18 Claims. (Cl. 219—4)

This invention relates to repeat welders. It has for its object welding apparatus in which the spot welding operation is rapidly repeated as long as the air is turned into the apparatus. This is accomplished by an automatic air-operated valve. It is not new to provide automatic repeat welders even in connection with welders that use pneumatic pressure to bring the electrodes together. But so far as I am aware repeat welders have either employed a rotating cam shaft or else employed complicated electrical apparatus.

It is the object of the present invention to provide welding apparatus especially for use on a portable welder in which the repeat actuation of the electrodes is done pneumatically and the only interposition of the human element is to control the air valve with a finger trigger. So long as the air valve is held open, the machine automatically brings the electrodes together, automatically switches on the current and properly times it, automatically withdraws the electrodes and then repeats the cycle of operations. This, I believe, affords a simplicity and effectiveness of repeat welding operations that heretofore have not been achieved.

Figure 1:
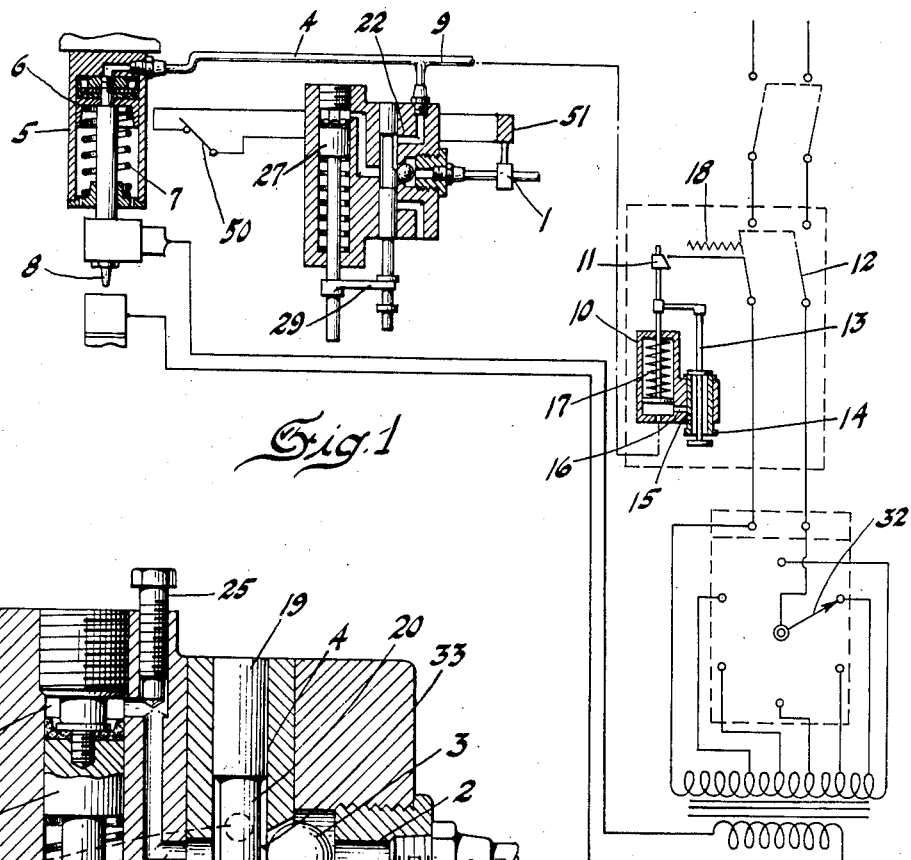
Fig. 1 is a diagrammatic view of the apparatus.
Figure 2:
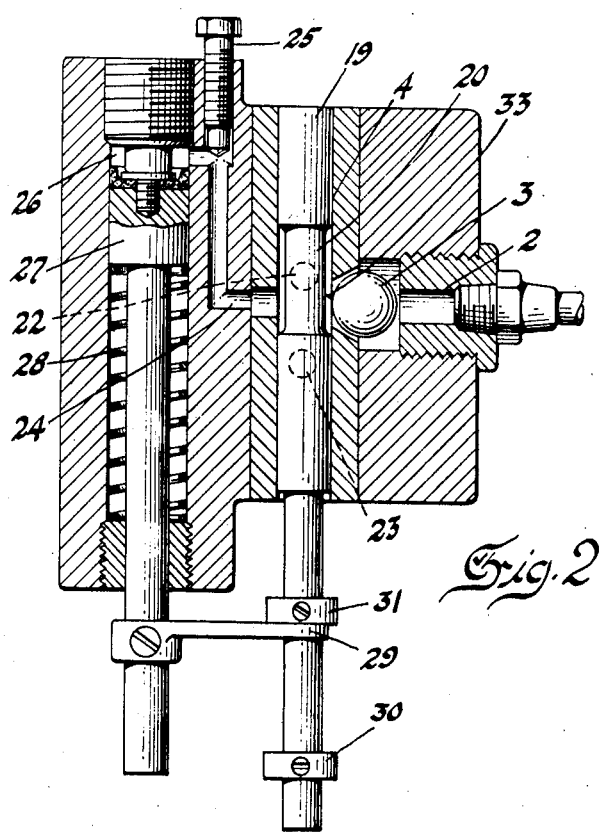
Fig. 2 is a section of the valve.

The apparatus is shown diagrammatically. Ordinarily, it will be more generally used with a portable welder having a handle, trigger type of air valve, etc. 1 designates the air valve that controls a supply of compressed air to the slide valve. This valve may be controlled from a remote point, to-wit: on the welding gun by the switch 50 and solenoid 51. The air enters through the port 2, passes around the ball check valve 3, thence through the pipe 4 to the cylinder 5 where it forces the piston 6 down against the action of the springs 7, thus bringing the electrode 8 against the work. The cylinder is part of the welding gun. At the same time, the air under pressure passes through the pipe 9 to the air cylinder 10 and lifts the cam 11 which closes the primary switch 12. At a given point in the movement of the cam, the rod 13 raises the sleeve valve 14 and brings the exhaust port 15 in registry with the passage 16 to exhaust the air behind the cam and the spring 17 immediately snaps the cam back to its initial position and the spring 18 opens the primary switch. This is not only a switch throwing cam but a timing cam in which the timing action can be accurately regulated by the design of the cam and also by the strength of the spring, the amount of air pressure, etc., employed. The switch and the cam are wholly operated by the same source of air pressure that operates the electrodes and properly timed with the movement of the electrodes.

The invention here claimed resides in the interposition of a pneumatically or fluid controlled device for repeating the cycle of operations. This takes the form of a simple slide valve but which is here used in properly timed relation to automatically exhaust the cylinder that controls the electrodes at predetermined time intervals. This valve is a sliding cylindrical valve 19 having a reduced portion 20. 22 is a passage leading to the pipes 4 and 9. 23 is an exhaust port. The passageway 24 controlled by valve 25 leads to the piston chamber 26. Valve 25 may be adjusted to control the restriction through this passage and, consequently, the timing of the piston 27.

The operation is: When the air valve 1 is open, the inclined shoulder 33 on valve 19 holds the check valve 3 open and the air passes into the repeat valve chamber around the cylindrical valve 19 through the pipe 4 into the cylinder 5 forcing the electrodes onto the work. At the same time, the pressure backs up into the timing cylinder 10 and starts the timing apparatus. This switching and timing apparatus is so timed as to not switch the current on until the electrodes are upon the work. The air at the same time passes into the cylinder 26 around the valve 25 but by reason of the restriction and the strength of the spring 28, sufficient pressure does not accumulate in the chamber 26 to cause the arm 29 to reach the collar 30 until the timing cam cuts off the primary current. Immediately after the primary current has been cut off the arm 29 strikes the collar 30 and moves the cylindrical valve 19 downwardly. This brings the reduced portion of the valve in registry with the exhaust port 23 and it is still in registry with the port leading into the pipe 4 that connects with the electrode cylinder. Consequently, both the chamber behind the piston 27 in the valve and the electrode cylinder are simultaneously relieved to the atmosphere. The inclined shoulder 33 withdraws from the check valve and allows this to cut off the air under pressure.

Immediately after the air pressure is relieved, the piston 27 is snapped back by the spring 28 and the arm 29 strikes the collar 31 raising the valve 19 and cutting off the exhaust 23 and again allowing the compressed air to reach the electrode cylinder and also get behind the piston 27 whereupon the apparatus repeats its cycle of operations. Of course, in order to successfully accomplish these operations, each of the three pistons must be accurately timed with respect to each other. The effective point in the movement of the switching and timing piston must lag behind the electrode piston and the valve controlling piston in reversing the air flow must lag behind the timing piston. This can be properly accomplished by properly controlling the restriction of the air flow, the strength of the springs, or the amount of travel of the piston before its action becomes effective, etc. However, the action of the pistons is very rapid, hence the timing will be very rapid as we prefer to employ a quick weld in which the current is on for only two cycles or about 1/30 of a second. It may be even as short as 1/100 of a second or less. This can be properly accomplished by the design of the cam or some of the other adjustments. The timing of the repeat can be adjusted by altering the restriction. Turning of the valve 25 will accomplish this. As stated above, quite a different switching and timing apparatus can be used.

The sections of the primary coil may cut in or out by moving the arm 32 around to its several stations as shown in Fig. 1.

Figure 3:
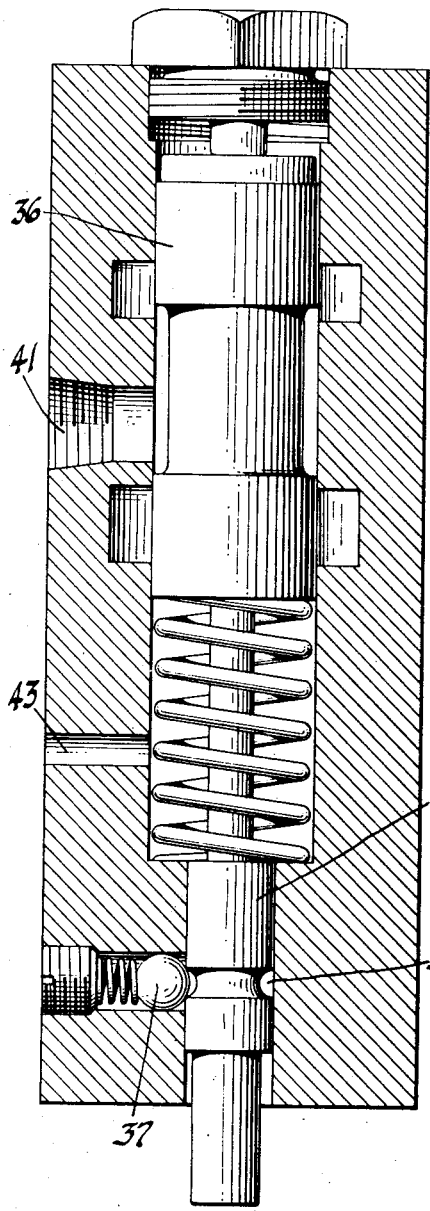
Figs. 3 and 4 are longitudinal sections taken at 90° points on a modified form of valve in which the actuating plunger and the valve are arranged coaxially.
Figure 4:
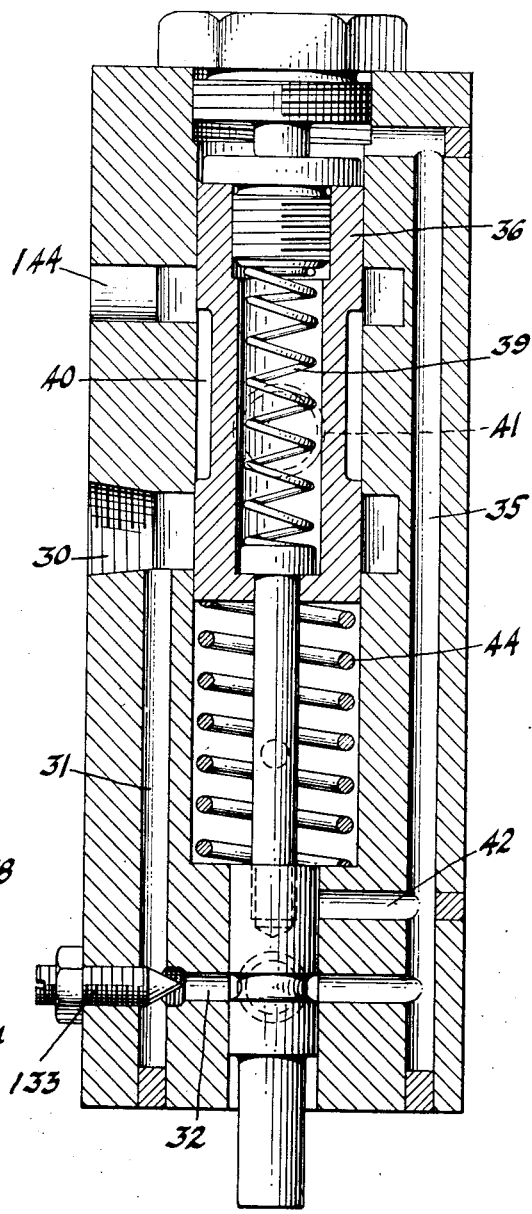

In Figs. 3 and 4, a modified form of valve and plunger is shown. Here air can enter through the port 30, pass down the passageway 31, thence through the passageway 32 which is guarded by the needle valve 133, thence around the annular groove 34 up into the passageway 35 and behind the piston 36. The detent 37 will hold the ancillary piston 38 until the spring 39 has been compressed to a given point at which time the detent 37 will give way and the two pistons will move together. However, before this has occured, the annular groove 40 has coupled up the air supply passageway 30 with the passageway 41 which leads to the electrode cylinder. When the pressure in the electrode cylinder builds up, it drives the main piston 36 further and presses the spring 39 to the point where this pushes the ancillary piston 38 down and closes the passageway 34 off from the air supply passageway 31 and thereby cuts off the pressure above the main piston 36. At the same time, the auxiliary piston has been pushed down below the passage 42. This connects the passage 35 which leads from above the cylinder to the chamber below the main piston and which is connected with the atmosphere by passage 43. Hence, the pressure above the piston is exhausted and the spring 44 snaps the valve back to its initial position, and exhausts the gun through the passages 41, 40 and 144. The air is again turned into the chamber above the piston through passageways 31, 32, 34 and 35, thus again repeating the operation.

What I claim is:

1. In a spot welder, the combination of primary and secondary circuits, a pair of electrodes, means for opening and closing the electrodes by the aid of power, automatic means for closing the primary circuit and timing the closure at each closing of the electrodes, a source of fluid pressure and means controlled by said fluid pressure for causing the electrode closing means to periodically repeat their cycle of operations as long as the fluid pressure is kept on.

2. In a spot welder, the combination of primary and secondary circuits, a pair of electrodes, means for opening and closing the electrodes by the aid of power, automatic means for closing the primary circuit and timing the closure at each closing of the electrodes, a source of fluid pressure and means controlled by said fluid pressure for causing the electrode closing means to periodically repeat their cycle of operations as long as the fluid pressure is kept on, said means provided with an adjustable needle valve for regulating the flow of the fluid by which the periods of repetition may be definitely varied.

3. In a repeat spot welder, the combination of a pair of electrodes, a primary and secondary circuit including a switch in the primary circuit, fluid actuated means for bringing the electrodes together including devices for separating the electrodes when the fluid pressure is released, means for automatically closing the primary switch and keeping it closed for a definite time, and means for automatically repeating the cycle of operations as long as the fluid pressure is on, comprising a fluid-controlled valve which periodically in properly timed relation exhausts the electrode cylinder and then closes the exhaust passage and returns the fluid to the electrode cylinder.

4. In a repeat spot welder, the combination of a pair of electrodes, a primary and secondary circuit including a switch in the primary circuit, fluid actuated means for bringing the electrodes together when the fluid pressure is turned on, means for automatically closing the primary switch and keeping it closed for a definite time during each bringing together of the electrodes and means for automatically repeating the cycle of operations as long as the fluid pressure is on, comprising a valve controlled by a cylinder and fluid actuated piston, said piston when pressure builds up behind it, serving to move the valve to exhaust the air from the electrode cylinder and also behind the said valve-controlling piston, and automatically operating means for returning said piston to its initial position, whereby the valve is returned to its position to deliver air again into the electrode cylinder and behind the said valve-controlling piston to repeat the said cycle of operation.

5. In a repeat spot welder, a primary and secondary circuit including a primary circuit switch, a pair of electrodes, three sets of fluid-operated cylinders and pistons for controlling respectively the approach of the electrodes, the closing of the primary switch, and the interruption of the flow of fluid to the fluid cylinder which controls the approach of the electrodes, said cylinders and pistons being timed to operate in the sequence stated, and means for returning the pistons after they have been fluid-operated.

6. In a repeat spot welder, the combination of a pair of electrodes, a primary and secondary circuit including a control switch for the primary circuit, a fluid operated device for causing the electrodes to approach towards each other, a second fluid operated device for switching on the current and a third fluid operated repeat device for temporarily interrupting the flow to and releasing the fluid in the two first mentioned fluid operated devices to cause a repetition of the cycle of operations as long as the fluid is allowed to flow.

7. In a repeat spot welder, the combination of a pair of electrodes and a primary and secondary circuit including a control switch for the primary, a fluid operated device for causing the electrodes to approach towards each other, means for returning the electrodes, and a control device operated by fluid pressure for controlling the last two mentioned means for reversing the movement of the electrodes, and repeating the cycle of operations as long as the fluid is turned into the device.

8. An apparatus of the character described comprising a fixed electrode, a movable electrode arranged in cooperative relation therewith, means for supplying current to said electrodes including a switch, fluid pressure means for reciprocating said movable electrode and for operating said switch, manually operated means for admitting pressure to said respective fluid pressure means, a valve intermediate said manually operated means and said fluid pressure means and a fluid operated piston and cylinder also controlled by said valve and arranged to reciprocate said valve whereby said movable electrode and said switch are reciprocated continuously in properly timed relation to form a series of individual welds during manual operation of said means.

9. In welding apparatus having relatively movable electrodes, means operated by fluid under pressure for relatively moving the electrodes, a control unit for said means operated by said fluid pressure to alternately effect relative movement of the electrodes into and out of engagement with the work at predetermined intervals, and means for varying the duration of said intervals.

10. In a repeat spot welder, the combination of a pair of electrodes, a primary and secondary circuit including a switch in the primary circuit, fluid actuated means for bringing the electrodes together including devices for separating the electrodes when the fluid pressure is released, means for automatically closing the primary switch and keeping it closed for a predetermined period of time while the electrodes are closed upon the work, and means for automatically repeating the cycle of operations as long as the fluid pressure is on, comprising a fluid-controlled valve which periodically in properly timed relation exhausts the electrode cylinder and then closes the exhaust passage and returns the fluid to the electrode cylinder.

11. An apparatus of the character described comprising a fixed electrode, a movable electrode arranged in co-operative relation therewith, means for supplying current to said electrodes including a switch, fluid pressure means for reciprocating said movable electrode and for operating said switch, a manually controlled valve for admitting pressure to said respective fluid pressure means, a second valve intermediate said manually controlled valve and said fluid pressure means, and a fluid pressure cylinder for controlling said second valve whereby said movable electrode and said switch are reciprocated continuously in properly timed relation to form a series of individual welds during operation of said manually controlled valve.

12. An apparatus of the character described comprising a fixed electrode, a movable electrode arranged in cooperative relation therewith, means for supplying current to said electrodes including a switch, fluid pressure means for reciprocating said movable electrode and for operating said switch, manually operated means for admitting pressure to said respective fluid pressure means, and means communicating with said manually operated means and said fluid pressure means including both a valve whereby said movable electrode and said switch are reciprocated continuously in properly timed relation to form a series of individual welds during manual operation of said means, and a cylinder and fluid operated piston operating said valve which controls also the fluid to said cylinder.

13. An apparatus of the character described comprising a pair of electrodes, one of said electrodes arranged to vibrate in cooperative relation with the other, means for supplying electrical energy to the electrodes including a switch, power responsive means in association with said vibratory electrode and said switch, power control and distributing means communicating with said power responsive means and adapted to automatically and repeatedly distribute power to said responsive means to actuate the vibratory electrode and switch upon a single application of power to said distributing means, power supply means for the distributing means, manually adjustable means in association with said power responsive means and the power control and distributing means for varying the timing relation in the operation of the switch and the electrodes, and means for manually controlling the circulation of power through the apparatus.

14. In welding apparatus having relatively movable electrodes, means operated by fluid under pressure for relatively moving the electrodes, a control unit for said means operative by said fluid pressure to alternately effect relative movement of the electrodes into and out of engagement with the work at predetermined intervals, and means for varying the duration of said intervals, comprising a valve to control the rate of flow of fluid operating said control unit.

15. In welding apparatus having relatively movable electrodes, means operated by fluid under pressure for relatively moving the electrodes, a control unit for said means operated by said fluid pressure to alternately effect relative movement of the electrodes into and out of engagement with the work at predetermined intervals, and means for varying the duration of the off cycle, comprising a valve to control the rate of flow of fluid from said control unit.

16. In welding apparatus having relatively movable electrodes, means operated by fluid under pressure for relatively moving the electrodes, a control unit for said means operated by said fluid pressure to alternately effect relative movement of the electrodes into and out of engagement with the work at predetermined intervals, and means for varying the duration of the on cycle, comprising a valve to control the rate of flow of fluid to said control unit.

17. An apparatus of the character described comprising a fixed electrode, a movable electrode arranged in cooperative relation therewith, means for supplying current to said electrodes including a switch, fluid pressure means for reciprocating said movable electrode and for operating said switch, a manually operated control for admitting pressure to said respective fluid pressure means and means in communication with said control and said fluid pressure means including a valve whereby said movable electrode and said switch are reciprocated continuously in properly timed relation to form a series of individual welds during manual operation of said control.

18. In a repeat spot welder, the combination of a pair of electrodes, a primary and secondary circuit including a switch in the primary circuit, fluid actuated means for bringing the electrodes together when the fluid pressure is turned on, means for automatically closing the primary switch and keeping it closed for a definite time during each bringing together of the electrodes, means for automatically repeating the cycle of operations as long as the fluid pressure is on, including a valve controlled by a cylinder and fluid actuated piston, said piston when pressure builds up behind it, serving to move the valve to exhaust the air from the electrode cylinder, the air behind the said valve-controlling piston being exhausted, and automatically operating means for returning said piston to its initial position, whereby the valve is returned to its position to deliver air again into the electrode cylinder, air being also delivered behind the said valve-controlling piston to repeat the said cycle of operation.

JOHN ABPLANALP.